Feb. 10, 1970 — R. N. HEIGHBERGER — 3,494,399
LOCKNUT BODY CONSTRUCTION
Filed March 7, 1968

INVENTOR
R.N. HEIGHBERGER
BY
Robb & Robb
ATTORNEYS

United States Patent Office 3,494,399
Patented Feb. 10, 1970

3,494,399
LOCKNUT BODY CONSTRUCTION
Robert N. Heighberger, Moreland Hills, Ohio, assignor to Jos. Dyson & Sons, Inc., Eastlake, Ohio, a corporation of Ohio
Filed Mar. 7, 1968, Ser. No. 711,301
Int. Cl. F16b 39/34
U.S. Cl. 151—15          5 Claims

ABSTRACT OF THE DISCLOSURE

This invention discloses nut construction in which a nut body is comprised of two nut members arranged to have a washer part positioned intermediate the same, and upon surfaces formed on the respective nut members in such a manner that relative rotation of one with respect to the other will cause the washer part to be displaced, or at least a portion of the material thereof toward the axis of the respective members and into engagement with the threads upon which the members are mounted in such a manner as to resist, if not entirely prevent unlocking or unscrewing operation of one or the other, or both of said members.

---

This invention relates to nut construction and particularly to construction of nuts which are desirably locked into position so that once positioned and without the necessity for separate locking devices, the same will be prevented from rotation with respect to the threads upon which the nut is seated, and yet permit under appropriate circumstances the removal of said nut when desired.

A particular object of the invention is to provide a nut body in which the same is comprised of nut members, having surface formations which are cooperative and between which is positioned a washer part preferably formed of a plastic material having a plastic memory, such that upon relative rotation of the respective parts this plastic material is brought into engagement with the threads upon which the parts are mounted whereby to prevent rotation of the entire body and in effect lock the same with respect to such threads.

A more particular object of the invention is to provide a nut construction as previously outlined, in which the washer part is formed of polytetrafluorethylene, said material having the characteristics desired and in more marked aspects than any other material known and used in the nut art.

An even more specific object of the invention is to provide nut members as previously outlined, which employ conical surfaces whose axes substantially coincide, said conical surfaces, however, being arranged in such a manner as to effect an actual displacement of material positioned therebetween toward the axis and thus into the interlocking position desired under the circumstances.

Further more particular objects of the invention will be understood from a consideration of the specification appended hereto and disclosed in the drawing wherein.

Figure 1:
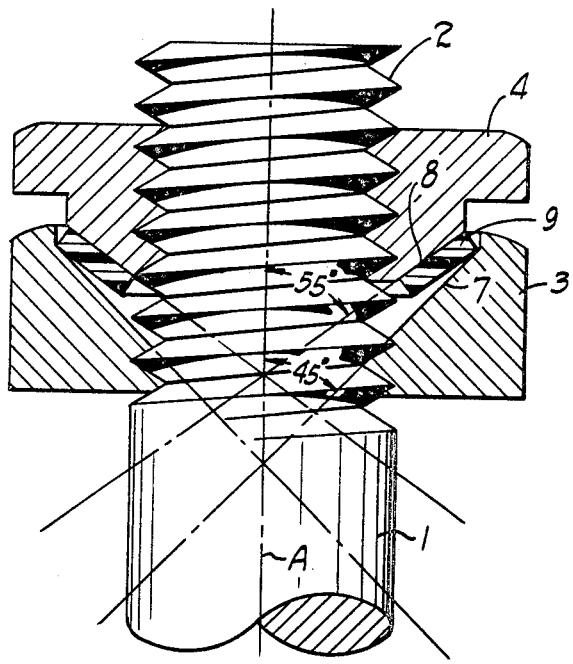
FIGURE 1 is a sectional view showing the nut construction of this invention as employed in position on a threaded bolt or other type of member.
Figure 4:
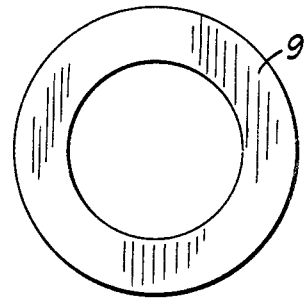
FIGURE 4 is a plan view of the washer part on a smaller scale.

Referring now to FIGURE 1, the invention hereof is shown as involving the threaded member 1 upon which suitable threads 2 are formed, these threads being of any preferred pitch in this instance the member 1 being shown comprising a bolt of 2-inch diameter with the threads 2 being of 8 pitch.

Figure 3:
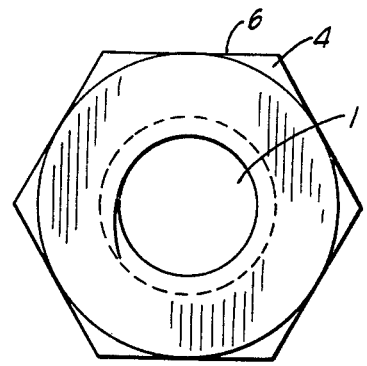
FIGURE 3 is a top plan view of the construction on a somewhat smaller scale.
Figure 2:
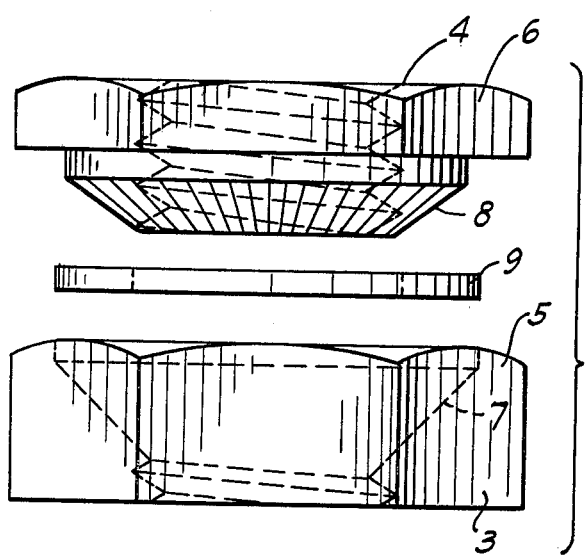
FIGURE 2 is an exploded view indicating the relative positions of the parts comprising the construction and further the types of surfaces used to carry out the objects hereof.

A nut body is disclosed as positioned on the threads 2, in this instance the nut body comprising a first nut member designated 3 and a second nut member designated 4, having the usual hexagonal surface configuration as suggested in FIGURES 2 and 3, such surfaces being designated 5 and 6 respectively.

As will be seen from FIGURES 1 and 2, the nut member 3 includes a cavity therein which is conical in formation and designated 7, the axis of said surface 7 coinciding with the axis A of the member 1; the surface 8 being a male conical surface whose axis also coincides with that of the axis A.

The angle of the surface 7 with respect to the axis A is on the order of 45 degrees; the angle of the surface 8 with respect to such axis is on the order of 55 degrees. It will thus be seen that the conical surfaces do converge at or outside of the actual surfaces formed in the nut members 3 and 4.

Intermediate the members 3 and 4, there is positioned a washer part designated 9, which is preferably formed of a plastic material whose plastic memory is such as to enter into the interlocking action sought, and in this instance said washer part is formed of polytetrafluorethylene, a material which has a very good plastic memory and has been found, for the purposes hereof, to be particularly effective.

The said washer 9 has initially a uniform cross-section as suggested in FIGURE 1, and is of such dimensions as to readily slip over the threads 2 and be positioned in the female cavity formed by the surface 7.

Upon relative rotation of the members 3 and 4 with respect to one another, that is as by holding the member 3 and rotating the member 4, the washer part 9 will be deformed by reason of the divergent angles of the surfaces 7 and 8, and the material actually displaced toward the axis A in such a manner as to engage the threads 2.

It will be apparent that suitable relative rotation of the parts will cause sufficient deformation of the material of the washer part 9 to actually efficiently engage the threads 2. Here the plastic memory of the material comes into action, and in attempting to return to its original shape, enters into an interlocking engagement with the threads 2.

It will of course be understood that the threads in the nut members 3 and 4 are desirably of the standard class of fit and the locking of the body comprising these members by the action of the washer part 9 is such as to prevent undesired unscrewing action of the entire body, thus in effect locking the said body against such action.

It should be sufficient to point out that the surfaces 7 and 8 may be formed in any preferred manner, and while the angles disclosed are 45 and 55 degrees respectively, it is certainly within the scope of this invention that such angles should be different, as long as they are divergent enough to effect the deformation of the material of the washer part 9 toward the threads 2 in such a manner as to effect the interlocking action sought and accomplished by the disclosure herein.

I claim:

1. In a compression actuated locknut, the combination comprising, a nut body, said body including first and second nut members separated by a pliant plastic washer interposed therebetween, said first nut member including a substantially polygonal body provided with a substantially flat bottom portion, upwardly extending side wall members and a threaded central bore, said first nut member further including a straight walled counterbore terminating in an angularly defined central cavity extending and tapering downwardly into said body coaxial with said counterbore and said threaded bore, said second nut member including a substantially polygonal body portion including a substantially flat upper surface, a threaded central bore, downwardly extending side walls, and provided with a substantial conical extension portion coaxial with said bore and substantially complementary to said central cavity and said counterbore in said first nut member, said extension including a straight walled portion adjacent the point of interconnection between the extension and said body of said second nut member, said straight walled portion of said extension dimensioned to be disposed within said straight walled counterbore portion of said cavity in said first nut member when said nut members are in assembled relation, and a substantially flat pliant plastic washer interposed between said first and second nut members within said cavity of said first nut member, said washer initially disposed within the counterbore portion of said first nut member and movable by plastic deformation into said angularly defined cavity upon rotation of said second nut member relative to said first nut member.

2. The combination as claimed in claim 1, wherein the deformable part is formed of polytetrafluorethylene.

3. The combination as claimed in claim 1, wherein the said surface of each nut member is a conical portion, the axis of which is substantially on the axis of such member, and the angle with respect to said axis is such as to compel displacement of the washer part toward said axis, upon the relative rotation described.

4. The combination as claimed in claim 1, wherein the angle of the surface on the first nut member is on the order of 45 degrees and that of the second member is on the order of 55 degrees.

5. The combination as claimed in claim 1, wherein the surfaces are arranged to displace at least a portion of the material from which the washer part is formed toward the axis of the surfaces.

References Cited

UNITED STATES PATENTS

| | | | |
|---|---|---|---|
| 646,898 | 4/1900 | Deiters | 151—14.5 |
| 1,473,321 | 11/1923 | Rumfelt | 151—15 |
| 2,075,467 | 3/1937 | Quesada | 151—14.5 |
| 3,174,522 | 3/1965 | Larentis et al. | 151—14 |
| 3,216,475 | 11/1965 | Jacobsen | 151—15 |
| 3,367,684 | 2/1968 | Anderson | 285—340 |

FOREIGN PATENTS

| | | |
|---|---|---|
| 238,511 | 2/1965 | Austria. |
| 685,966 | 1/1953 | Great Britain. |
| 950,963 | 3/1964 | Great Britain. |
| 1,006,102 | 9/1965 | Great Britain. |
| 516,068 | 2/1955 | Italy. |

MARION PARSONS, Jr., Primary Examiner